Patented Feb. 1, 1927.

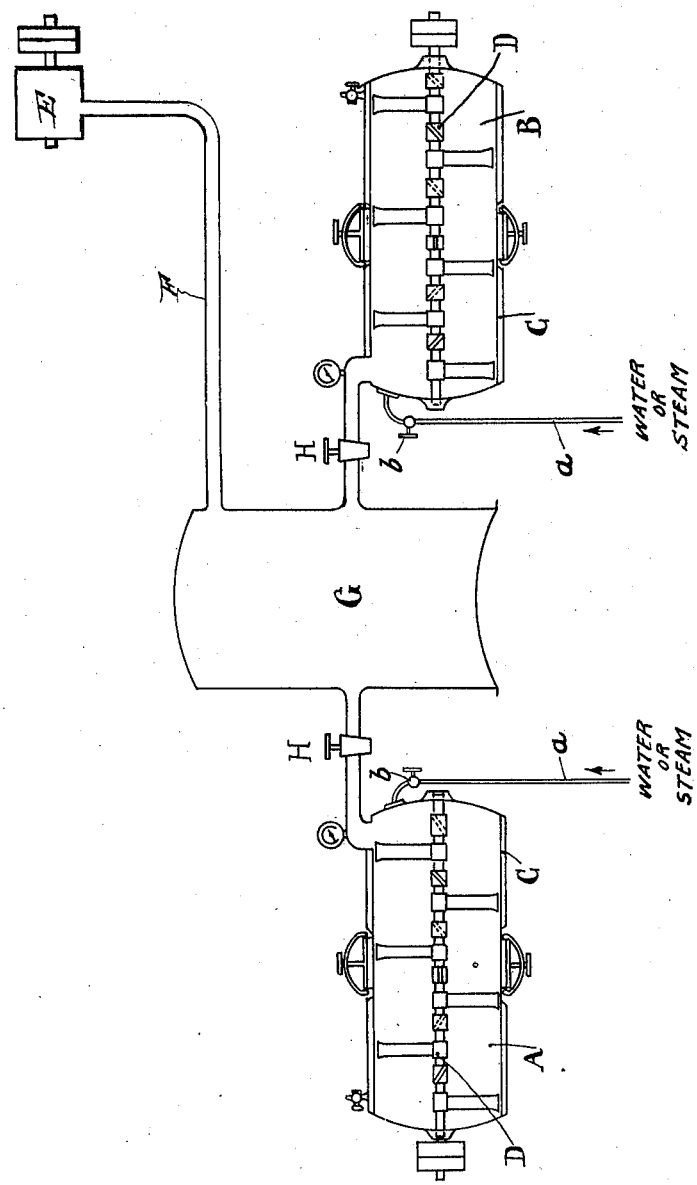

1,616,319

UNITED STATES PATENT OFFICE.

GEORGES KAMMERMANN, OF PARIS, FRANCE.

PROCESS FOR THE TREATMENT OF OLEAGINOUS SEEDS OR OLEAGINOUS VEGETABLE SUBSTANCES FOR THE PURPOSE OF EXTRACTING THE OIL CONTAINED THEREIN.

Application filed February 1, 1924. Serial No. 689,991.

This invention has for its object a process for the preliminary treatment of oleaginous seeds and fruits to obtain a larger proportion of oil, the latter being subsequently extracted by the usual means that is to say by pressure and the use of a solvent.

Up to now the oleaginous vegetable seeds were usually crushed, heated and moistened with water during the crushing operation and then squeezed in the cold or in the hot state. Some oleaginous seeds were submitted to an initial pressing in the cold without previous moistening and then to a second and sometimes a third pressing while hot with previous moistening. This method is generally employed in modern oil extracting works.

The heating and moistening of the oleaginous seeds have for their purpose to soften the latter and swell the cells thereof so as to cause them to more easily break up under the influence of pressure.

It has also been proposed to treat amylaceous substances such as grains of wheat, rice or maize by a cooking under pressure, the temperature reaching 300° C., then subjecting them to a sudden reduction of pressure whereby the cells will burst, and there will be finally obtained a spongy mass; but this method cannot be used for oleaginous seeds, for should they be heated under pressure to such temperatures the result would be a pasty mass from which it would be difficult to extract the oil.

It has also been proposed to treat oleaginous seeds or like matters by first grinding them, then drying them and finally moistening them so as to obtain a uniform degree of humidity before extracting the oil by pressure.

According to my invention I heat the oleaginous seeds as is done in known methods in order to soften them, and to raise the temperature of the moisture or water which they contain; I then subject them to a sudden vacuum, so that said moisture or water, when thus heated will be brought to a sudden and violent ebullition, being converted into vapor, and thus causing the explosion or bursting of each of the cells; the oleaginous grain or like matter is then moistened in order to restore the moisture lost in the said vacuum treatment, and finally the substance is subjected to the usual operations, such as the extraction of the oil by pressure or by a solvent.

Another feature of the invention consists in the fact that the substance is mixed or stirred up during the vacuum treatment.

The treatment of the oleaginous matters comprising the aforesaid operations may be carried out, for example, in an apparatus of the type illustrated in the accompanying drawings.

My said apparatus comprises two vessels or digesters A and B provided with a jacket C for the circulation of steam for indirect heating, and each vessel is provided with a stirrer D.

The two vessels containing the seeds are connected by suitable conduits provided with taps H with a large vessel G in which a high vacuum is produced by a pump E that is connected with the vessel G by a conduit F.

The operation, which may be continuous, is performed in the following manner:

The oleaginous seeds are charged into one of the vessels, for instance the vessel A which is slightly heated, and said vessel is then connected with the vacuum chamber G; the vacuum as complete as possible is suddenly applied and is maintained for a few minutes while rotating the stirrer D in vessel A. The moisture in the oleaginous seeds or the like, contained in the vessel A will be converted into vapour and will cause the cells to burst.

When this operation is completed the tap H is closed. The mass is then moistened, for instance by delivering steam or water into said vessel through a pipe $a$ controlled by a cock $b$. This injection is effected immediately after the oleaginous seeds have been subjected to the vacuum treatment and while the vacuum still prevails in the mixing chamber A. In this condition the oleaginous matter, which has acquired the property of absorbing water, will rapidly absorb all the moisture supplied to it, and this will be uniformly distributed. The temperature of the seeds at the time when the vacuum is produced is 60 to 70 degrees C., and the vacuum is maintained for about 10 minutes.

This amount of moisture should be equal in principle to the amount of moisture which is disengaged from the substance during the vacuum treatment. The amount of moisture varies with the nature of the seeds and with their state of dryness. This latter is observed at the time at which a fresh lot of seeds is to be operated upon, and the degree of moisture, after the vacuum treatment, is again observed upon a sample taken out, so as to determine the amount of moisture which the substance lacks by reason of the vacuum treatment.

The operations are performed in like manner in the vessel B, and it is obvious that one vessel may be charged while the other is discharged, connecting the said vessels alternately with the vessel G in order to provide for a continuous operation.

The final moistening, which serves to restore to the grain the moisture which has been removed during the vacuum process, may be effected outside of the digester in a separate apparatus of any suitable nature.

What I claim is:

1. In a process of extracting oil from oleaginous seeds, or the like by means of pressing, facilitating the release of the oil held by the oil-bearing seeds by heating the seeds, then subjecting the heated seeds to a suddenly applied vacuum which causes the bursting of the cells thereof by the ebullition of the moisture contained therein, together with a subsequent step of moistening the bursted cells in order to restore the moisture which was lost during said vacuum treatment.

2. In a process of extracting oil from oleaginous seeds, or the like by means of pressing, facilitating the release of the oil held in the oil bearing seeds by heating the seeds, subjecting the heated seeds to a suddenly applied vacuum which causes the bursting of the cells thereof by the ebullition of the moisture therein, stirring the seeds while subjecting them to the vacuum, and subsequently moistening the bursted cells to restore the moisture which was lost during the vacuum treatment.

In testimony that I claim the foregoing as my invention, I have signed my name hereto.

GEORGES KAMMERMANN.